United States Patent Office 3,564,047
Patented Feb. 16, 1971

3,564,047
CRYSTALLINE ANHYDROUS AMINO TRI(METH-YLENEPHOSPHONIC ACID)
Riyad R. Irani, St. Louis, Mo. (9106 Ambleside Drive, Mentor, Ohio 44060), and Kurt Moedritzer, 408 Belleview Ave., Webster Groves, Mo. 63119
No Drawing. Continuation-in-part of application Ser. No. 152,048, Nov. 13, 1961. This application Dec. 23, 1964, Ser. No. 420,795
Int. Cl. C02b 5/06; C07f 9/38; C11d 3/36
U.S. Cl. 210—502.5                 1 Claim

ABSTRACT OF THE DISCLOSURE

Crystalline anhydrous amino tri(methylenephosphonic acid) useful as a sequestering agent, a deflocculating agent and a detergent builder.

---

This is a continuation-in-part of application Ser. No. 152,048 filed Nov. 13, 1961 and now U.S. Pat. No. 3,288,846.

This invention pertains to a new and novel compound, crystalline anhydrous amino tri(methylenephosphonic acid).

K. A. Petrov and co-workers described the preparation of amino tri(methylenephosphonic acid) by the reaction of diethyl phosphite, ammonia and formaldehyde, followed by hydrolysis of the amino tri(methylenephosphonate) ester product to amino tri(methylenephosphonic acid) in Zhur. Obschei Khim., 29, 591–4 (1959) [Chem. Abs., vol. 54, 260 (1960)]. Amino tri(methylenephosphonic acid) was described in the foregoing article as a "glassy mass." By following the teachings of Petrov et al., as described more fully hereinafter, amino tri(methylenephosphonic acid) prepared by the foregoing method was found to exhibit inferior physical and chemical properties which rendered it essentially unfit for any type of commercial use.

It has now been found that amino tri(methylenephosphonic acid), that is, a compound having the structure:

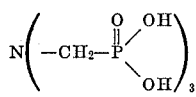

can be prepared as a crystalline anhydrous product exhibiting superior chemical and physical properties which render it suitable for commercial use such as, for example, a sequestering agent, deflocculating agent, detergent builder and the like.

The following examples illustrate the present invention.

EXAMPLE I

Into a conventional jacketed, glass-lined mixing vessel fitted with a water condenser are charged 246 parts of orthophosphorous acid, 53 parts of ammonium chloride, and 100 parts of water. The pH of the resulting mixture is about 0.5. This mixture is then heated to its reflux temperature, which under atmospheric pressure is about 108° C. Over a period of 30 minutes, while the mixture is being refluxed, a total of 95 parts of paraformaldehyde are added slowly into the boiling mixture. After being refluxed for an additional 20 minutes, the mixture is cooled to ambient temperature and analyzed [by observing and measuring the nuclear magnetic resonance spectra (N.M.R.) of the product] to determine how much of the P-H bond (from $HPO(OH)_2$ of orthophosphorous acid) has been converted to the N-C-P bond of the product, amino tri-(methylenephosphonic acid). By N.M.R. analysis, the product yield, based on the amount of phosphorous in the starting material, is about 95%. About 5% of the original orthophosphorous acid in the reaction mixture remains unreacted.

Upon cooling to about 20° C., crystalline anhydrous amino tri(methylenephosphonic acid) precipitates from the solution. By chemical analysis it is identified as practically pure amino tri(methylenephosphonic acid); found 12.3% C, 31.6% P, 3.92% H (calculated: 12.0% C, 31.1% P, 4.04% H). It exhibits the following X-ray diffraction pattern (CuK α radiation):

| Line [a]: | d,A. |
|---|---|
| 1 | 4.02 |
| 2 | 3.91 |
| 3 | 3.77 |
| 4 | 3.48 |
| 5 | 4.75 |

[a] Five strongest lines in order of decreasing intensity.

EXAMPLE II

The following is the preparation of amino tri(methylenephosphonic acid) by the foregoing described Petrov et al. method.

Into a conventional jacketed, glass-lined mixing vessel fitted with a water condenser are charged 65 parts of 28% aqueous ammonia solution and 445 parts of diethyl phosphite. The mixture is cooled to −10° C. and 260 parts of 37% aqueous formaldehyde solution are added at a rate such that the temperature is maintained at 15 to 20° C. After addition, the reaction mixture is heated to reflux for about 1 hour. On cooling, the reaction product is neutralized to pH of 9 with 10% NaOH and extracted twice with equi-volume portions of benzene. The extract is then dried over $K_2CO_3$ before distilling off the benzene and unreacted materials (diethyl phosphite) (150° C./10–15 mm. Hg). The product, hexaethyl amino tri-(methylenephosphonate) distills at 185.5–198° C. at $5 \times 10^{-2}$ mm. Hg pressure with a yield of about 46 parts (10% by theory).

Six grams of the above prepared ester are then placed in a glass tube with 40 cc. HCl (1:1), sealed and heated at 140° C. for 5 hours. The contents of the tube, after being opened, are poured into a flask and placed on a steam bath. The HCl is removed by alternately evaporating to dryness (aspirator vacuum) and dissolving in water. At the end of two days and after using 1,000 ml. of water, the HCl was still present in the product. Titration with base indicates the product, a dark brown glass, contains about 75% amino tri(methylenephosphonic acid).

The following table sets forth a comparison of the physical and chemical properties of the crystalline anhydrous amino tri(methylenephosphonic acid) of the present invention (Example I), and amino tri(methylenephosphonic acid) prepared by the Petrov et al. method (Example II).

TABLE 1

| Property | Amino tri(methylene phosphonic acid) Example I | Amino tri(methylene phosphonic acid) Example II |
|---|---|---|
| Physical appearance | White, free-flowing crystals. | Dark brown glass, amorphous. |
| Hygroscopicity (24 hours at 50% RH, 25° C.) | .15% wt. gain, still free-flowing (nonhygroscopic) | Over 3% wt. gain, turns soupy (very hygroscopic). |
| Melting point | 210-212° C.(d) | Softens 50-90° C. |
| Rate of dissolution in water (0.7 grams in 100 cc. $H_2O$ at 25°C.). | 1'07'' | 4'32''. |
| Active concentration on product by titration | 100% | About 75%. |
| Sequestration of $Ca^{++}$ (grams of $Ca^{++}$ by 100 grams of material at pH-11 in presence of 0.1% $Na_2C_2O_4$. | 13.6 | About 8.8. |
| Ease of purification | Obtained as pure, crystalline product. | Could not be purified by reprecipitation.[1] |
| Ease of milling | May be ground to powder | Impossible to handle in mill, tends to gum up. |

[1] When this material was dissolved in water and acetone added to effect precipitation, the product separated out as a dark, viscous oily layer.

As can be appreciated from the foregoing table, the crystalline anhydrous amino tri(methylenephosphonic acid) exhibits superior physical and chemical properties as compared to the amino tri(methylenephosphonic acid), an amorphous glassy mass, prepared by the Petrov et al. method and the compound of the present invention is suitable for commercial use while the compound prepared by the Petrov et al. method, as drammatically illustrated from the foregoing, is essentially unsuitable for commercial use. As can be appreciated from the foregoing, the compound of the instant invention is truly a compound of a different kind than the compound represented by the Petrov et al. method.

What is claimed is:

1. Crystalline anhydrous amino tri(methylene phosphonic acid).

References Cited

UNITED STATES PATENTS

| | | |
|---|---|---|
| 2,328,358 | 8/1943 | Pitman. |
| 2,841,611 | 7/1958 | Bersworth. |
| 3,234,124 | 2/1966 | Irani. |
| 3,288,486 | 11/1966 | Irani et al. |

OTHER REFERENCES

Petrov et al., "Chem. Abst.," vol. 4, col. 260 (1960).

Kosolapoff, "Organophosphorus Compounds" (1950), pp. 143, 155 and 156.

BERNARD HELFIN, Primary Examiner

J. E. EVANS, Assistant Examiner

U.S. Cl. X.R.

210—30; 252—152